2,884,535

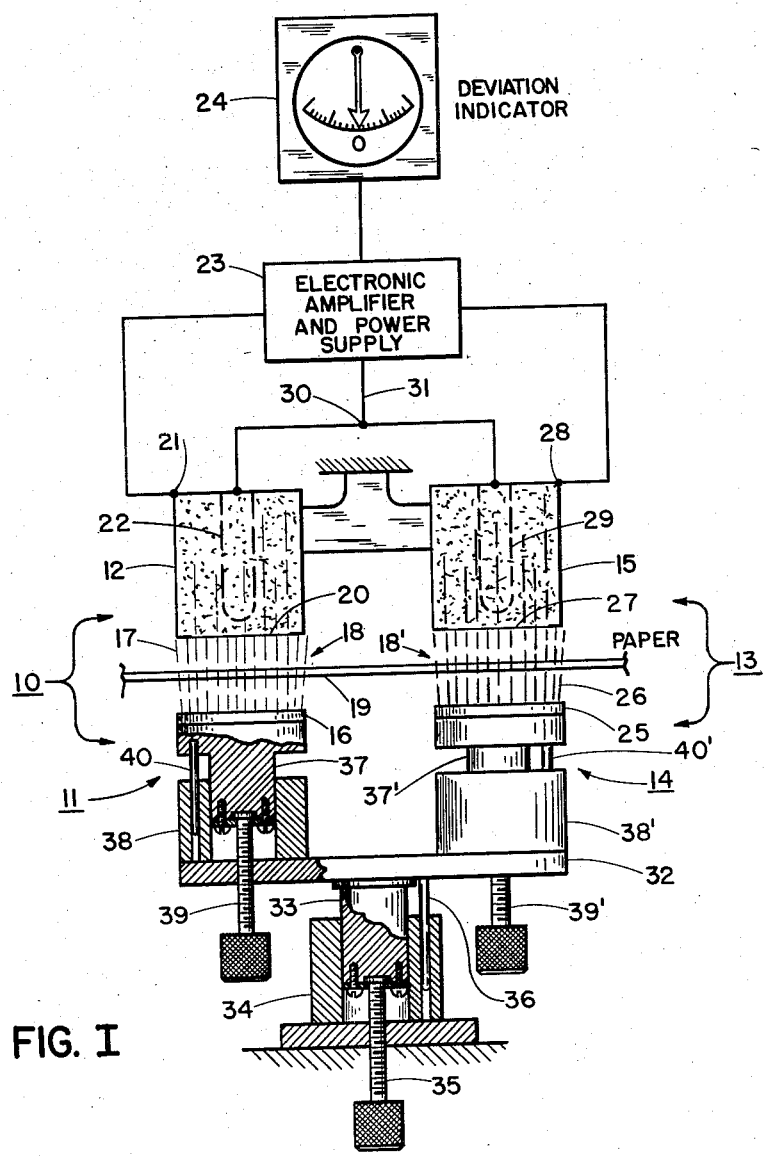
FIG. I

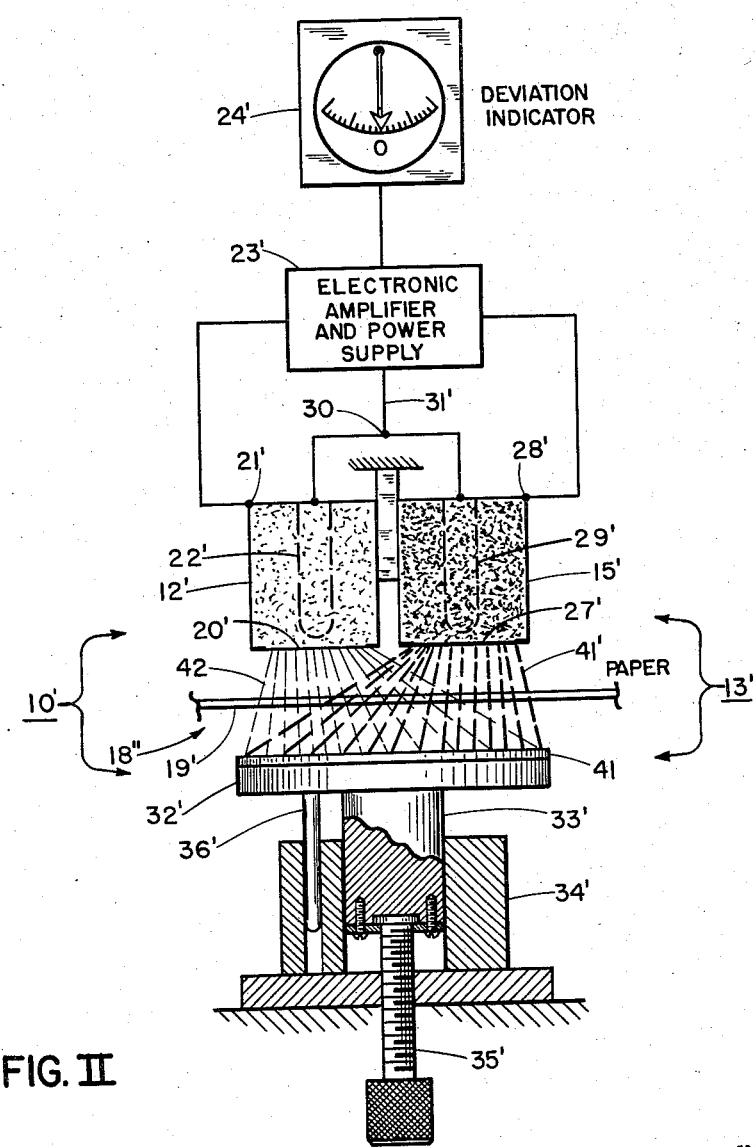
FIG. II
April 28, 1959 — W. E. SWIFT, JR — 2,884,535
RADIO-ACTIVE GAUGING SYSTEM
Filed Jan. 26, 1956 — 2 Sheets-Sheet 2
INVENTOR.
WILLARD EVERETT SWIFT, JR.
BY
Lawrence H. Poeton
AGENT even though the source-ionization chamber spacings may vary, this invention provides electrical connections between the amplifier and power supply unit 23 and the electrodes 28 and 29 of the ionization chamber 15 of the second measuring combination 13. Thus, the second measuring combination 13 provides an additional output which is applied to the deviation indicator 24 in combination with the output of the first measuring combination 10.

RADIO-ACTIVE GAUGING SYSTEM

Willard Everett Swift, Jr., Sharon, Mass., assignor to The Foxboro Company, Foxboro, Mass., a corporation of Massachusetts Application January 26, 1956, Serial No. 561,508

5 Claims. (Cl. 250—83.6)

This invention relates to ionizing radiation gauging systems using radiation sources of the radio-active isotope class, and has particular reference to the use of combination measurements in such a system to produce a single measurement with respect to a particular variable, wherein said variable is a function of the degree of ionization accomplished in said system.

This invention involves a gauging system wherein radiations from a radio-active source pass through a suitable gap, such as an air gap, into an ionization chamber. In some instances a material to be tested is placed in the air gap. This material may be paper, and the variable condition thereof which is being measured may be the basis weight of the paper. In any case, the ionization chamber is polarized and contains air or other suitable gas, for example, argon or a mixture of argon and nitrogen. The gas in the ionization chamber is ionized by the radiations from the radio-active source. Thus the degree of ionization in the ionization chamber, and consequently the electrical current through the ionization chamber polarization arrangement, are functions of the radiation strength of the source and of the absorption factor of the air in the gap, and of the material in the gap where such is used.

Gauging sources for use in such systems may comprise solid members charged with radio-active materials such as thallium 204, cesium 137, a gas such as krypton, or the like.

Ionizing radiations of this nature decrease in intensity at the ionization chamber as the separation between the source and the ionization chamber increases. A small gap width change produces an appreciable error in radiation strength in the ionization chamber. In situations where a material to be measured is in the air gap, such gap width change errors are particularly undesirable.

A problem arises in gauging systems of this nature because such errors may readily be produced by changes in temperature, vibration, handling, or some form of impact.

This invention provides measurement means which overcome this problem and make the source-ionization chamber spacing noncritical. This is accomplished by using a multiple source-ionization chamber arrangement and by providing a combination measurement therefrom which is negligibly affected by such spacing changes.

It is accordingly an object of this invention to provide an improved radio-active gauging system.

It is a further object of this invention to provide a raido-active gauging system wherein the adverse effects of source-chamber spacing changes are minimized.

Other objects and advantages of this invention will be in part apparent and in part pointed out hereinafter.

In the drawings:

Figure I is a schematic illustration of a radio-active gauging system according to this invention; and Figure II is an illustration of an alternate system with respect to that of Figure I.

As an illustrative embodiment of this invention, the radio-active gauging system of Figure I is provided with a first measuring combination 10, comprising a relatively weak radio-active source unit 11 and an ionization chamber 12, and with a second measuring combination 13 comprising a relatively strong radio-active source unit 14 and an ionization chamber 15.

The first combination is provided with a radio-active beta ray gauging source 16 which is a solid body, charged with material such as soft radiation thallium 204. The source 16 emits beta rays 17 which pass through an air gap 18, and through a body of material 19 under test in the gap 18, to and into the ionization chamber 12 of the first measuring combination by way of a thin stainless steel beta ray permeable window 20 in the ionization chamber 12. The material 19 may be paper, and the measured variable may be the basis weight of the paper. It should be noted that the same paper, preferably closely adjacent portions thereof, is measured by both of the measuring combinations 10 and 13. The ionization chamber 12 contains a gas such as argon or a mixture of nitrogen and argon and the beta rays entering the ionization chamber ionize this gas to a degree which is a factor of the basis weight of the paper. Thus as the paper absorbs varying amounts of the beta radiation due to basis weight variation in the paper, the degree of ionization in the chamber 12 is also varied. The ionization chamber 12 is electrically polarized through a supply electrode 21 and a collector electrode 22. Accordingly, varying electrical current may flow in the ionization chamber 12 in representation of the basis weight variation in the paper 19. For this purpose electrical connections are provided between an amplifier and power supply unit 23 and the ionization chamber electrodes 21 and 22. The ionization chamber 12 output is ordinarily thus amplified and then is applied to a deviation indicator 24. As a zero setting, ordinarily, the deviation indicator 24 is set to mid-scale in representation of a predetermined basis weight value of the paper 17 and increase or decrease of the basis weight results in deviation from this zero in the indicator 24 to the left or right as the case may be.

The air gap 18 distance between the beta ray source 16 and the ionization chamber 12 is a substantial factor in the degree of ionization accomplished in the chamber 12. Changes in this air gap distance result in changes of an exponential order in the degree of ionization. Accordingly the system must ordinarily be very carefully set up and maintained in its positional and locational relationships. However, this invention provides means for overcoming this difficulty, and this is accomplished by providing the second measuring combination 13 and associating it with the first measuring combination 10 on an output combination compensating basis.

The second measuring combination 13 is provided with a radio-active source 25, which is a solid body, charged with material such as hard radiation strontium 90. The source 25 emits beta rays 26, which pass through an air gap 18' and through the paper 19 under test, to and into the second measuring combination ionization chamber 15 by way of another thin stainless steel beta ray permeable window 27 in the ionization chamber 15.

The second measuring combination 13 is formed, and operates generally like, the first measuring combination 10 described hereinbefore. The chamber 15 contains an ionizable gas and is electrically polarized through a supply electrode 28 and a collector electrode 29. The measurement in this case is also the basis weight of the paper 19. Also in the second measuring combination 13, the degree of ionization of the gas in the chamber 15 and consequently the electrical current through the chamber is materially affected by variations in the air gap 18' spacing between the source unit 14 and the ionization chamber 15. Such changes have been discussed above with reference to the first measuring combination 10.

As a means of providing a combined measurement, the output of the second measuring combination ionization chamber 15 is electrically bucked against the output of the first measuring combination ionization chamber 12. This is accomplished by suitable conventional arrangements in the amplifier unit 23. As one arrangement, the collector electrodes are electrically connected as at 30, and have from this point a common lead 31 to the amplifier unit 23. Thus the outputs of the chambers 12 and 15 are electrically bucked against each other and the deviation indicator 24 responds to the differential thereof. The deviation indicator is, accordingly, zeroed with respect to this differential.

Since the beta ray sources 16 and 25 provide radiations of different strength, because source 16 is thallium 204 and source 25 is strontium 90, a basis weight change in the paper 19 will have a different absorption effect on the radiation from the source 16 than it has on the radiation from the source 25. This difference produces a differential measurement which is representative of the basis weight change.

The differential measurement thus obtained remains essentially the same, regardless of spacing changes between the sources and their respective ionization chambers, over a reasonable span, providing the spacing change is the same for both measuring combinations. This is assured by mounting both sources on a single mounting plate 32 and by mounting the ionization chambers together. Thus any spacing change is equally applied to both of the source-ionization chamber combinations. Adjustment of the sources toward and away from their respective ionization chambers is provided, both for joint adjustment and for individual adjustment, for purposes of assembly or calibration. The joint adjustment is accomplished through a support shaft 33 on which the plate 32 is mounted, with the shaft 33 movable in a sleeve 34 by means of an adjustment screw 35, and with a keying pin 36 associated with this device to prevent rotational movement of the sources 16 and 25 as they are so adjusted. The individual sources are likewise individually adjustable in similar fashion by means of supports, sleeves, screws, and keying pins as indicated respectively at 37, 38, 39, 40, and 37', 38', 39', and 40'.

In the Figure I system it may be desirable to increase the differential between the ionization strength of the radiation sources. This may be done by individual adjustment of the sources so that, for example, the gap between source 25 and chamber 15 is substantially less than the gap between source 16 and chamber 12.

Figure II illustrates a combination measurement gauging compensation system which is structurally quite similar to that of Figure I although based on somewhat different measurements. In this Figure II system one source-ionization chamber combination (41—12') responds to both variable condition change (paper basis weight change) and source-chamber spacing change. The other source-ionization chamber combination (41—15') responds effectively only to source-chamber spacing change. A single source (41) of radiation is used. This source is cesium 137 which emits gamma rays 41 as well as beta rays 42. Two ionization chambers 12' and 15' are used, these being conditioned to respond respectively to the beta and gamma rays from the cesium source. The gamma ray chamber 15' is provided with the usual ionizable gas, but substantially pressurized so that the gamma rays 41' will be more effective in ionization thereof. Also the window 27' is of substantial thickness because of the extra radiation strength of the gamma rays. The beta ray chamber 12' is the same as its Figure I counterpart 12 except that the window 20' is substantially thicker because of the extra beta radiation strength from the cesium as compared to the thallium or strontium of Figure I.

The Figure II beta and gamma rays are shown as directed specifically to their respective chambers only, as a means of illustrating their effective action areas. Actually the beta rays impinge on the gamma chamber and the gamma rays travel through the beta chamber without appreciable operative effect in relation to this invention.

The entire system of Figure II otherwise is essentially the same, in structure and operation, as that of Figure I, and the Figure I reference numbers are therefore applied to like portions of Figure II as primed numbers. Since the Figure II system is a single source system, the supporting and adjusting structure therefore is compared and referenced with respect to the joint supporting and adjusting structure of Figure I. That is, there is no individual source adjustment in the system of Figure II.

Measurement of radiation strength may be accomplished with the arrangements of this invention by leaving out the paper in the air gap. This measurement may thus be made essentially without error due to air gap width change.

This invention, therefore, provides a new and improved radio-active gauging device wherein the measurement is taken on a differential basis.

As many embodiments may be made of the above invention, and as changes may be made in the embodiments set forth above, without departing from the scope of the invention, it is to be understood that all matter set forth or shown in the accompanying drawings is to be interpreted as illustrative only and not in a limiting sense.

I claim:

1. A radio-active gauging system comprising a first ionization chamber for receiving relatively soft radiation, a second ionization chamber for receiving hard radiation, radiation source means for emitting said soft and hard radiation, means for combining the outputs of said chambers to produce a single measurement with respect to a particular variable, wherein said variable is a function of the degree of ionization of at least one of said chambers, a single rigid support on which said source means is rigidly mounted and a single rigid support on which both of said ionization chambers are rigidly mounted whereby any spacing change between said source means and one of said ionization chambers is also accomplished between said source means and the other of said ionization chambers.

2. A radio-active gauging system comprising a first ionization chamber for receiving relatively soft radiation, a second ionization chamber for receiving relatively hard radiation, radiation source means for emitting said soft and hard radiation, means for differentially combining the outputs of said chambers to produce a single measurement, a single rigid source support on which said source means is rigidly mounted, means for adjusting said support to vary the distance relation between said source means and said ionization chambers, and a single rigid ionization chamber support on which both of said ionization chambers are rigidly mounted.

3. A radio-active gauging differential system comprising a first measuring combination of a radio-active source and an ionization chamber, said first combination being sensitive to both paper and measuring distance, a second measuring combination of a radio-active source and an ionization chamber, said second combination being insensitive to paper and sensitive to measuring distance with said second combination having radiation which is substantially harder than the radiation of said first combination, means for differentially combining the outputs of said combinations to produce a single measurement with the measuring distance factor cancelled therefrom, a single rigid support on which both of said sources are rigidly mounted, means for adjusting said support to simultaneously and uniformly vary the distances between said sources and their respective ionization chambers, means for adjusting at least one of said sources individually with respect to said support and in relation to the ionization chamber respective thereto, and a single rigid support on which both of said ionization chambers are rigidly mounted.

4. A radio-active gauging differential system comprising a first measuring combination of a radio-active source facility and an ionization chamber, a second measuring combination of a radio-active source facility and an ionization chamber, a single rigid support on which both of said source facilities are rigidly mounted, said source facilities comprising a single body of cesium 137 as an emitter of both beta and gamma rays, one of said ionization chambers comprising a relatively low pressured volume of ionizable gas in a chamber with a relatively thin window for the reception of the said beta rays and the other of said ionization chambers comprising a relatively high pressured volume of ionizable gas in a chamber with a relatively thick window for the reception of said gamma rays, means for differentially combining the outputs of said combinations to produce a single measurement, and a single rigid support on which both of said ionization chambers are rigidly mounted.

5. A radio-active gauging differential system comprising a first measuring combination of a radio-active source and an ionization chamber, a second measuring combination of a radio-active source and an ionization chamber, said first combination source comprising a body of thallium 204 for producing relatively soft beta radiation, and said second combination source comprising a body of strontium 90 for producing relatively hard beta radiation, means for differentially combining the outputs of said combinations to produce a single measurement, a single rigid support on which both of said sources are rigidly mounted, and a rigid support on which both of said ionization chambers are rigidly mounted.

References Cited in the file of this patent

UNITED STATES PATENTS

| | | |
|---|---|---|
| 2,097,760 | Failla | Nov. 2, 1937 |
| 2,264,725 | Shoupp et al. | Dec. 2, 1941 |
| 2,296,176 | Neufeld | Sept. 15, 1942 |
| 2,349,753 | Pontecorvo | May 23, 1944 |
| 2,643,343 | Rainwater | June 23, 1953 |